(12) United States Patent
Seksaria et al.

(10) Patent No.: US 7,296,845 B2
(45) Date of Patent: Nov. 20, 2007

(54) COMBINED PALM-LATCH REINFORCEMENT FOR CLOSURE PANELS

(75) Inventors: Dinesh C. Seksaria, Novi, MI (US); Richard A. Sokol, Harrison City, PA (US); Russell S. Long, Murrysville, PA (US)

(73) Assignee: Alcoa Inc., Pittsburgh, PA (US)

( * ) Notice: Subject to any disclaimer, the term of this patent is extended or adjusted under 35 U.S.C. 154(b) by 141 days.

(21) Appl. No.: 11/038,808

(22) Filed: Jan. 19, 2005

(65) Prior Publication Data

US 2006/0158007 A1 Jul. 20, 2006

(51) Int. Cl.
  *B62D 25/12* (2006.01)
  *B62D 25/10* (2006.01)
(52) U.S. Cl. ............... 296/146.6; 296/193.11; 180/69.21
(58) Field of Classification Search ........... 296/193.11, 296/191, 202, 146.6; 180/69.2, 69.21, 69.12, 180/68.4
See application file for complete search history.

(56) References Cited

U.S. PATENT DOCUMENTS

| 5,535,841 | A | | 7/1996 | Cobes, Jr. et al. | 180/69.2 |
| 5,538,094 | A | | 7/1996 | Cobes, Jr. et al. | 180/69.2 |
| 5,833,024 | A | * | 11/1998 | Kaneko | 180/69.2 |
| 6,247,744 | B1 | | 6/2001 | Townsend et al. | 296/146.11 |
| 6,394,211 | B1 | | 5/2002 | Palenchar et al. | 180/69.21 |
| 6,450,276 | B1 | | 9/2002 | Latcau | 180/68.4 |
| 6,502,653 | B1 | | 1/2003 | Balzer et al. | 180/68.4 |
| 6,692,057 | B2 | | 2/2004 | Igarashi et al. | |

* cited by examiner

*Primary Examiner*—Dennis H. Pedder
*Assistant Examiner*—Melissa A Black
(74) *Attorney, Agent, or Firm*—Greenberg Traurig LLP; Peter J. Borghetti

(57) ABSTRACT

A reinforcement for a closure panel including an outer panel and an inner panel includes a palm area reinforcement for attachment to the outer panel and a latch area reinforcement for attachment to the inner panel, the latch area reinforcement being disposed on a depression in the reinforcement which is integral with the palm area reinforcement.

16 Claims, 6 Drawing Sheets

COMBINED PALM-LATCH REINFORCEMENT FOR CLOSURE PANELS

FIELD OF THE INVENTION

The present invention relates to structural aspects of hoods, deck lids and other closure panels, and, in particular, relates to reinforcement of hoods and deck lids for motor vehicles.

BACKGROUND OF THE INVENTION

Closure panels such as hoods and deck lids of motor vehicles generally include an inner panel and an outer panel. The inner and outer panels are connected to each other at various locations so they cooperate to provide a structure which is more rigid than either panel separately, and which has a stiffness which is much greater than the sum of the separate stiffnesses of the panels. For hoods and deck lids, the outer panel lies above the inner panel and is part of the exterior of the vehicle. The inner panel is only visible when the hood or deck lid is open.

Typically, when a closure panel is manufactured, the inner and outer panels are formed separately. The exact shape of the outer panel is defined by the desired form of the vehicle. The inner panel is designed to mate with the outer panel. For example, there may be truncated cones formed on the inner panel. Adhesive is placed on the truncated surfaces of these cones and then the outer panel is placed over the inner panel, so the truncated surfaces of the cones are adhered to the outer panel. The perimeters of the inner and outer panels are then joined in a hemming operation. In this operation, the edge of the outer panel is bent around the edge of the inner panel.

The closure panel is generally secured in a closed position by a latch on the vehicle which engages a latch engagement member on the closure panel. The latch is on the frame or other portion of the vehicle which is not part of the closure panel. The latch engagement member may be a striker plate, or a loop of metal which is referred to as a wire loop. Generally, the latch engagement member is at the end of the closure panel which is farthest from the hinges which attach the closure panel to the vehicle.

The latch engagement member for a hood, deck lid or other closure panel is typically located on the inner panel. The latch area of the inner panel, where the latch engagement member is attached, may experience high forces due to wind loads, inertial forces, or closure forces. Also, the outer panel, in the vicinity of the latch area of the inner panel, may experience large forces due to persons pressing on the outer panel to close the hood, deck lid or other closure panel, and engage the latch. If it is not sufficiently stiff, this area may deform when it is pressed to close the panel.

It is known in the art to attach various reinforcement members to the inner panel and the outer panel to withstand these forces. In the most common arrangement, a palm area reinforcement is attached to the outer panel. For a hood or deck lid, the palm area reinforcement is attached to the underside of the outer panel. For a hood, the palm area reinforcement is attached to the outer panel at its front end. For a deck lid, the palm area reinforcement is attached at the rear end of the outer panel.

Also, for a hood or deck lid, a latch area reinforcement is usually attached to an upper surface of the inner panel. The latch area reinforcement provides added strength and stiffness to the portion of the inner panel adjacent the latch engagement member. For a hood, it is attached to the front end of the inner panel, for a deck lid, it is attached at the rear end of the inner panel.

FIG. 1 is a sketch of a prior art reinforcement assembly 10 which provides reinforcement for both the palm area and the latch area. The reinforcement assembly 10 is shown inverted in order to show details.

Reinforcement assembly 10 includes a palm area reinforcement 12 which, during assembly of the closure panel, is adhesively bonded to the palm area of the outer panel. Palm area reinforcement 12 may have grooves 14 and 15 to provide increased rigidity. Grooves 14 and 15 appear as ridges in FIG. 1 because reinforcement assembly 10 is shown inverted.

Reinforcement assembly 10 also includes a latch area reinforcement 16 which is assembled to the palm area reinforcement 12 at 18 and 19. Latch area reinforcement 16 has an opening 17 which is to be aligned with an opening on the inner panel (not shown in this figure) where the latch engagement member is mounted.

During assembly of the hood or deck lid, the assembly 10 is inverted and the latch area reinforcement 16 is attached to the inner panel, positioned so that opening 17 is aligned with the latch opening in the inner panel. Adhesive is then placed on the palm area reinforcement 12 on the side 11 which is opposite the side shown in FIG. 1. Then, when the outer panel is put in place, the palm area of the hood or deck lid is pressed down onto the surface 11 of the palm area reinforcement 12 of the reinforcement assembly 10. Typically, the adhesive on the reinforcement assembly 10 is a thermosetting adhesive. When the paint bake operation is subsequently performed on the hood or deck lid, the adhesive is cured.

In addition to the art cited above, which is standard practice in the motor vehicle industry, a number of patents relate to reinforcement in the palm and latch areas of closure panels.

U.S. Pat. No. 5,538,094 and the related patent, U.S. Pat. No. 5,535,841, teach a reinforcement member attached to both the inner and outer panels in the latch area of a car hood. The reinforcement member is elongate and has a C-shaped cross section. It is mounted transversely relative to the hood. The C-shaped member is made of a lightweight material such as aluminum or plastic.

The C-shaped member encloses a plate made of a strong material such as steel. The steel plate has a flanged hole, and the hood is secured in a closed position by a latch member which passes through the flanged hole, and engages the flange. The steel flange resists wear.

U.S. Pat. No. 6,247,744 teaches sub assemblies having self-aligning members for hinges and latches of vehicle doors, hoods or trunks. The sub assemblies may be used with vehicle hoods, trunks, liftgates and deck lids. They serve to integrate the closure member with the vehicle body.

U.S. Pat. No. 6,394,211 teaches a latch system for a hood and fender assembly on a truck.

U.S. Pat. No. 6,450,276 provides an illustration of the typical mounting of a hood latch on a front end assembly of a motor vehicle.

INTRODUCTION TO THE INVENTION

The present invention is for closure panels, particularly for hoods and deck lids of motor vehicles. It is for closure panels comprised of an outer panel and an inner panel. The invention provides reinforcement in the latch area on the inner panel. The latch which secures the panel in a closed position engages a latch engagement member attached to the latch area on the inner panel. The latch, itself, is generally connected to the frame or other portion of the vehicle, which is not a part of the panel. The latch area reinforcement stiffens the inner panel in the latch area, and distributes the latch loads to the inner panel.

The invention also provides palm area reinforcement. It reinforces the outer panel in the palm area, which is the region adjacent the latch area on the inner panel. It is to resist forces due to a person pressing on the panel to close it. For the hood of a motor vehicle, it is the front end of the hood. For a deck lid of a motor vehicle, it is at the rear of the lid.

One objective of the present invention is to provide a single element which provides reinforcement in the palm area and also reinforcement in the latch area of a closure panel such as a hood or deck lid.

Another objective is to provide a combined palm area and latch area reinforcement which is an integral unit which does not itself require assembly.

Another objective of the present invention is to provide a palm-latch reinforcement which can be made from sheet metal by punching and stamping operations.

SUMMARY OF THE INVENTION

In one aspect, the present invention is a reinforcement for a closure panel including an outer panel and an inner panel. The inner panel includes a latch area and the outer panel includes a palm area adjacent the latch area of the inner panel. The reinforcement includes a palm area reinforcement, the palm area reinforcement being for attachment to the palm area of the outer panel. There is also a depression integral with the palm area reinforcement, the depression including an integral latch area reinforcement which is for attachment to the latch area of the inner panel.

In another aspect, the present invention is a closure panel for a motor vehicle, the closure panel including an inner panel and an outer panel, the inner panel including a latch area, the outer panel including a palm area adjacent the latch area of the inner panel. The closure panel further includes a reinforcement including a palm area reinforcement attached to the palm area of the outer panel, the reinforcement further including a depression integral with the palm area reinforcement, the depression including an integral latch area reinforcement attached to the latch area of the inner panel.

In an additional aspect, the present invention is a method of making an integral palm-latch reinforcement. The method includes stamping a sheet of metal to form a palm area reinforcement, and a depression integral with the palm area reinforcement, the depression including an integral latch area reinforcement.

In a further aspect, the present invention is a method of making a closure panel for a motor vehicle. The method includes stamping a first sheet of metal to make an outer panel for the closure panel, the outer panel being configured in accordance with the exterior design of the motor vehicle. A second sheet of metal is also stamped to make an inner panel for the closure panel, the inner panel including a plurality of raised portions for attachment to the outer panel. A third sheet of metal is also stamped to make an integral palm-latch reinforcement. The method further includes attaching the palm-latch reinforcement to the inner panel, placing adhesive on a palm area reinforcement portion of the integral palm-latch reinforcement, placing adhesive on the plurality of raised portions of the inner panel, placing the outer panel over the inner panel and the integral palm-latch reinforcement, hemming a perimeter of the closure panel, and causing the adhesive on the palm-latch reinforcement portion of the integral palm-latch reinforcement and the adhesive on the raised portions of the inner panel to set.

DETAILED DESCRIPTION OF PREFERRED EMBODIMENTS

In this description of the invention, terms denoting direction including upper, depression, raised, front, rear, etc. relate to the invention applied to a hood of a motor vehicle. When applied to other closure panels, directional terms would be changed appropriately.

Figure 1:
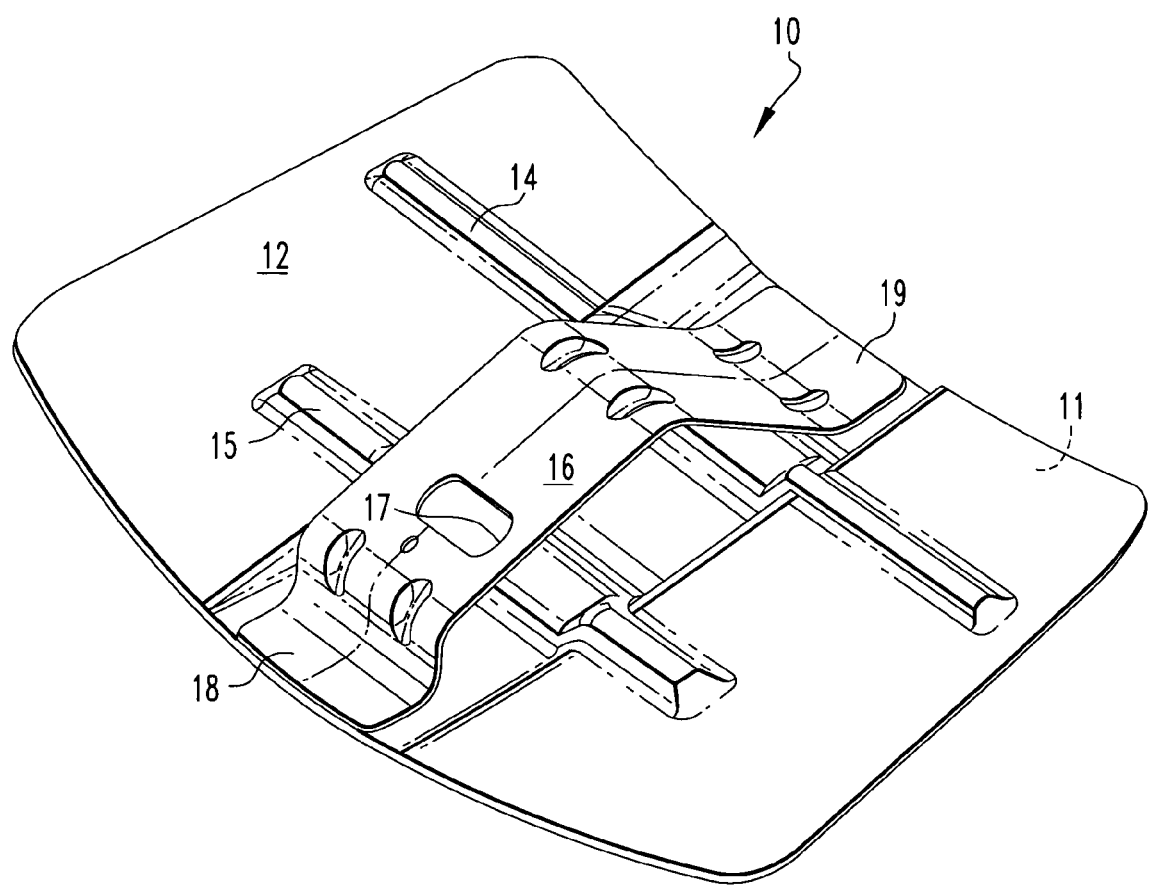
FIG. 1 is a perspective sketch of a prior art reinforcement assembly including a palm area reinforcement and a latch area reinforcement.
Figure 2:
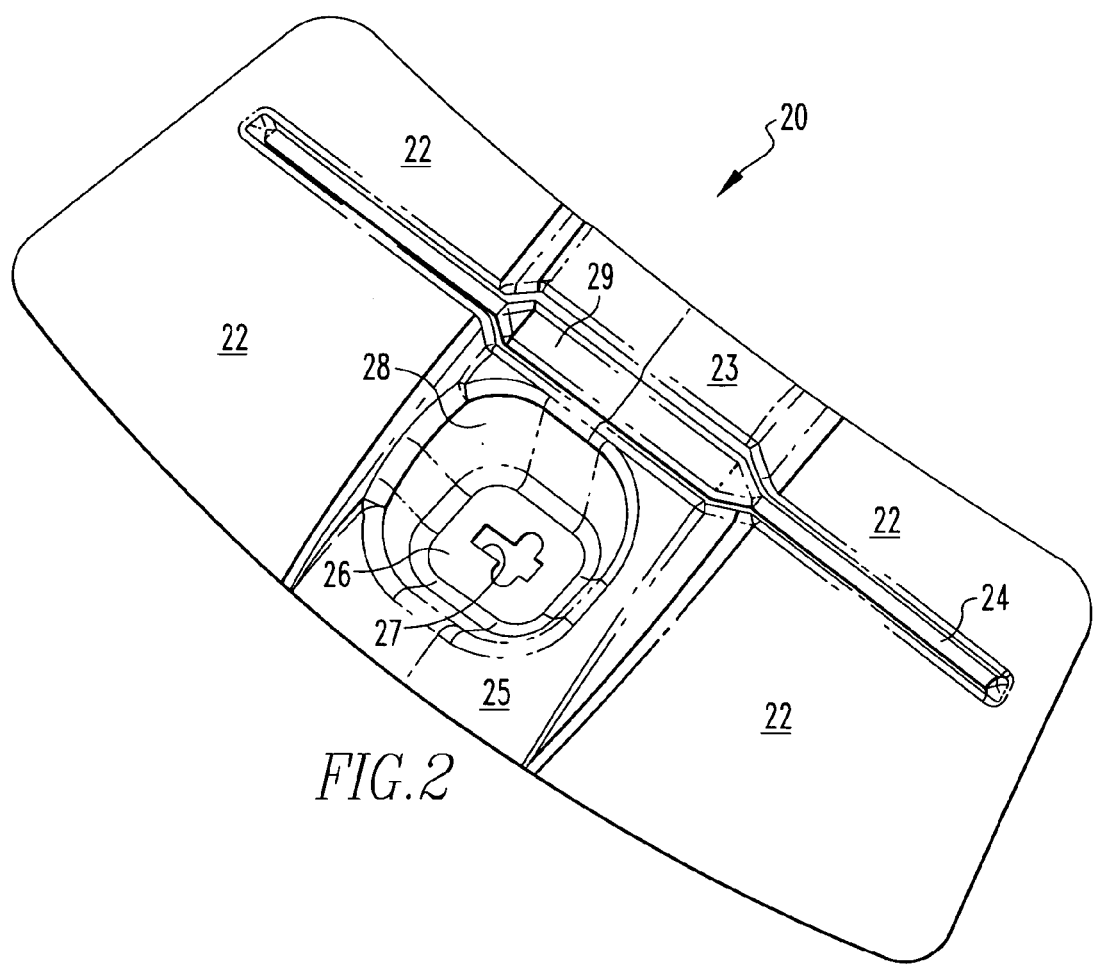
FIG. 2 is a perspective sketch of a combined palm-latch reinforcement according to the present invention.
Figure 3:
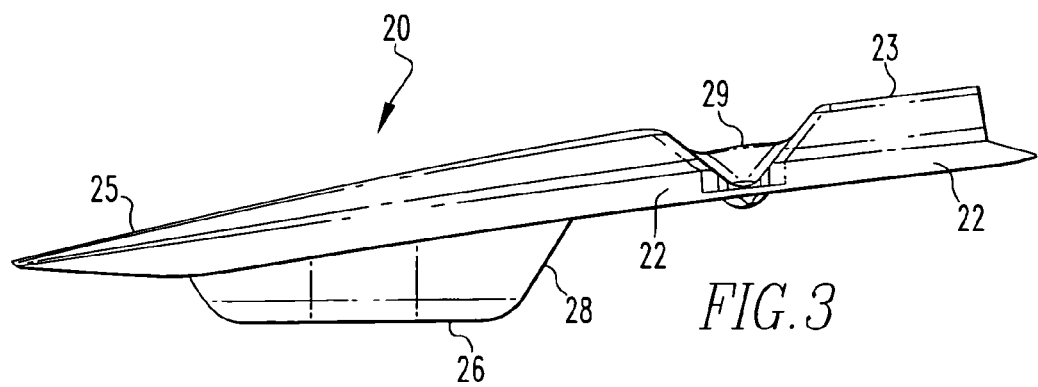
FIG. 3 is an end view of the palm-latch reinforcement shown in FIG. 2.

FIGS. 2 and 3 illustrate a palm-latch reinforcement 20 according to the present invention. Palm-latch reinforcement 20 may be made by punching and stamping a sheet metal blank. Palm-latch reinforcement 20 includes a palm area reinforcement 22 having inner portions 23 and 25. Reinforcement 20 includes a depression 28 having a latch area reinforcement 26 at a bottom portion of depression 28. Latch area reinforcement 26 includes an opening 27 which is for the latch.

Preferably, the palm area reinforcement 22 includes a transverse groove 24 including a groove center portion 29. The transverse groove 24 including groove center portion 29 serves to stiffen the palm area reinforcement 22.

Figure 4:
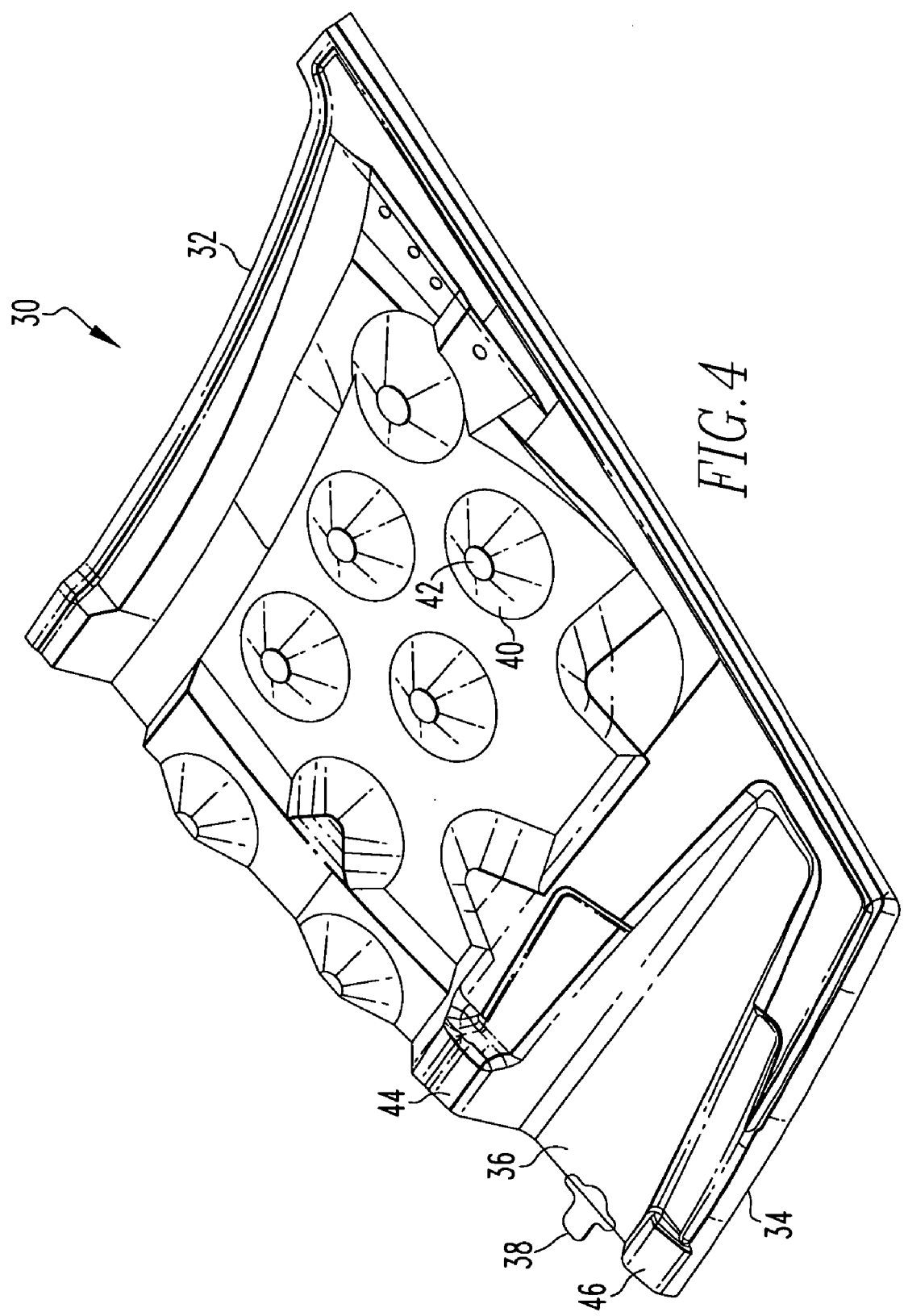
FIG. 4 is a perspective sketch of a typical inner panel of a hood for a motor vehicle.

FIG. 4 is a perspective sketch showing one half of an inner panel 30 for a hood of a motor vehicle. Inner panel 30 has rear end 32 and front end 34. Inner panel 30 has a latch area, 36, and the outline of opening 38 is sketched. Opening 38 is for receiving the latch (not shown). Inner panel 30 may include truncated cones 40 including truncated surfaces 42.

Rear surface 44 is for attachment of the inner back portion 23 of the combined palm-latch reinforcement 20. Front surface 46 is for attachment of the inner front portion 25 of the combined palm-latch reinforcement 20. When the combined palm-latch reinforcement 20 is assembled to the inner panel 30, the latch area reinforcement 26 of the palm-latch reinforcement 20 is in contact with latch area 36. Opening 27 in latch area reinforcement 26 is aligned with opening 38 in latch area 36.

Figure 5:
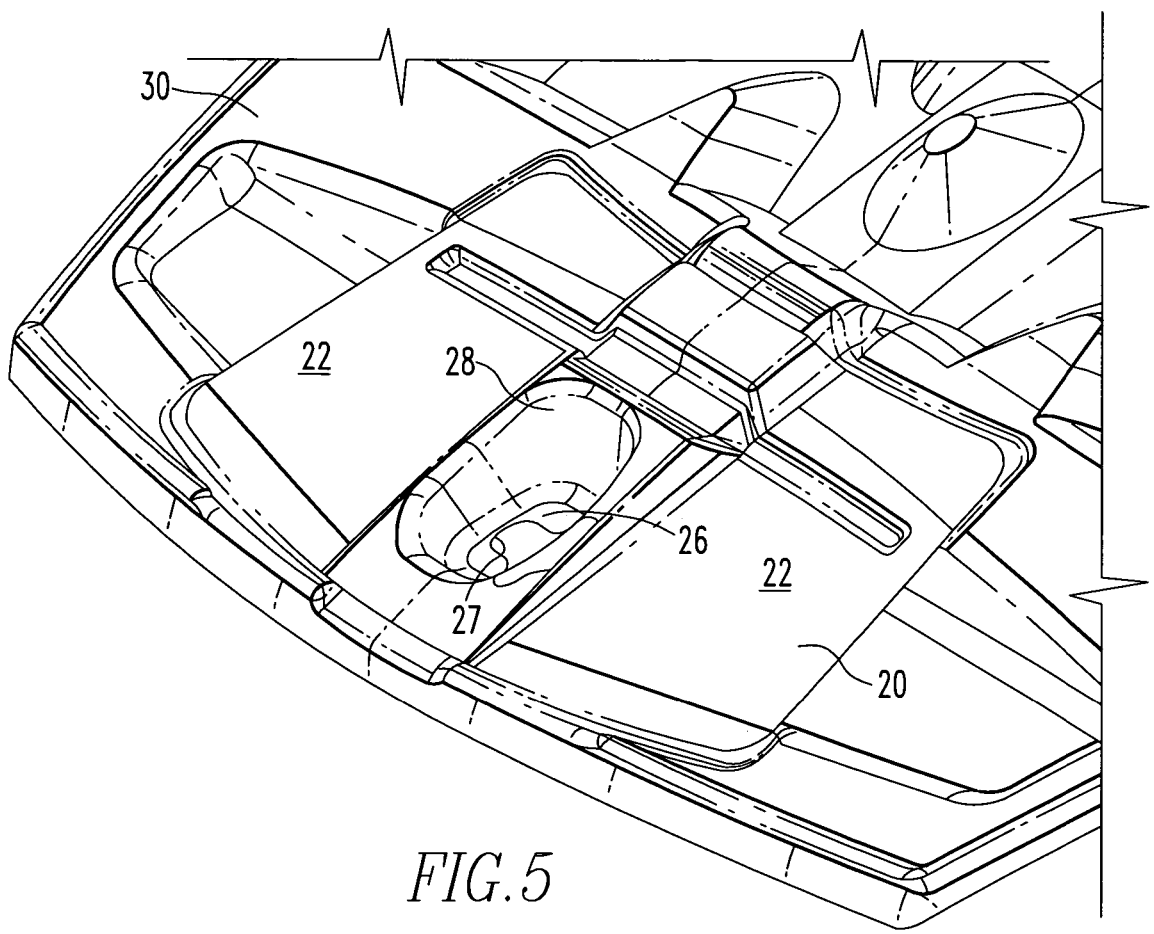
FIG. 5 is a perspective sketch of a palm-latch reinforcement according to the present invention, after it has been assembled to the inner panel illustrated in FIG. 4.
Figure 6:
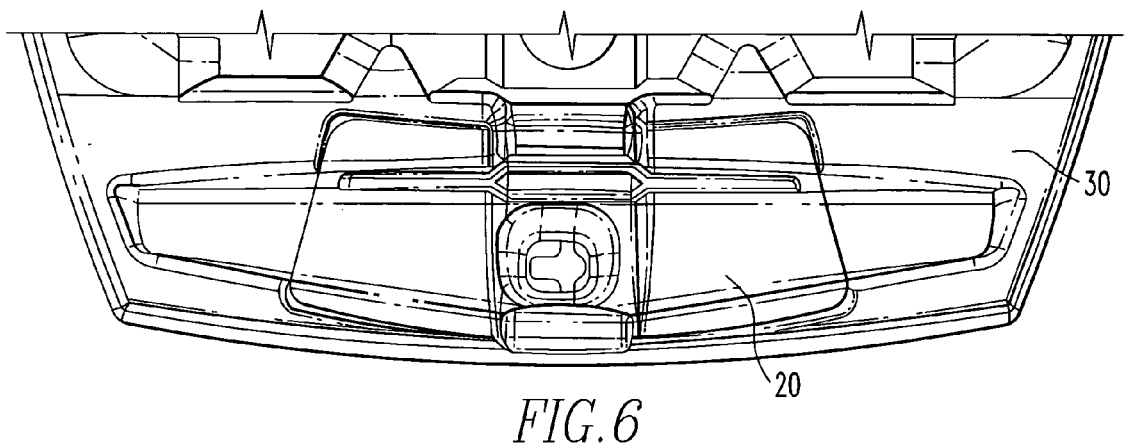
FIG. 6 is a top view of the assembly shown in FIG. 5.

FIG. 5 illustrates the palm-latch reinforcement 20 assembled to the inner panel 30, and FIG. 6 is a top view of this assembly.

Figure 7:
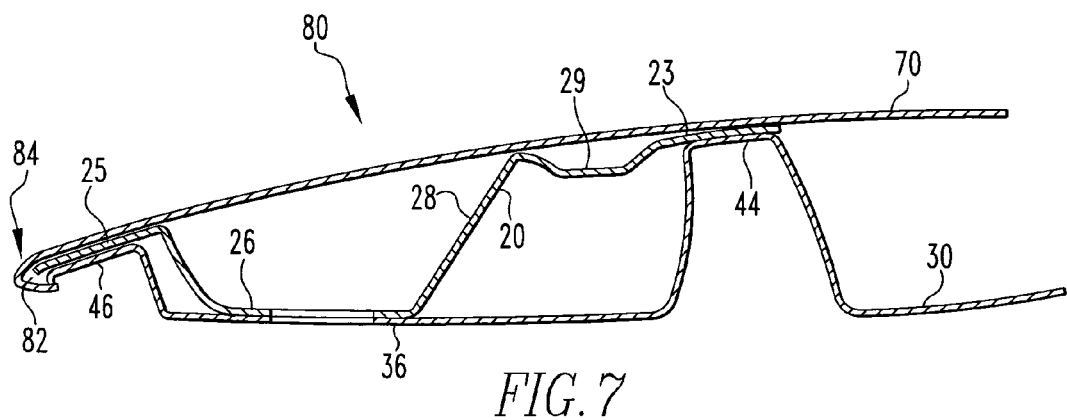
FIG. 7 is a sketch illustrating a median section cut through a motor vehicle hood after the palm-latch reinforcement has been attached to the inner panel, and the outer panel has been attached to both.

FIG. 7 is a median section of the hood 80 of a motor vehicle. FIG. 7 shows inner panel 30 having rear surface 44, latch area 36, and front surface 46. The inner panel 30 has overlaid thereon the combined palm-latch reinforcement 20 having inner back portion 23, center portion of stiffening groove 29, depression 28 including latch area reinforcement 26 and inner front portion 25.

After the inner panel 30 and combined palm-latch reinforcement 20 are assembled, as shown in FIGS. 5 and 6, the outer panel 70 is placed over the assembly. Preferably, outer panel 70 is attached by adhesive placed on portions of the inner panel 30 such as the truncated surfaces 42 of cones 40 and the palm area 22 of the palm-latch reinforcement 20 which contacts the outer panel 70.

The inner panel 30 and outer panel 70 are also joined by a hemming operation in which the edge of the outer panel 70 is bent around the edge of the inner panel to form a hemmed edge 82. The front end of the hood 80 is denoted 84. In a typical process, a paint bake operation follows the assembly of the inner panel 30, palm latch reinforcement 20 and outer panel 70. During the paint bake operation, the adhesive joining inner panel 30, palm latch reinforcement 20 and outer panel 70 is set.

Figure 8:
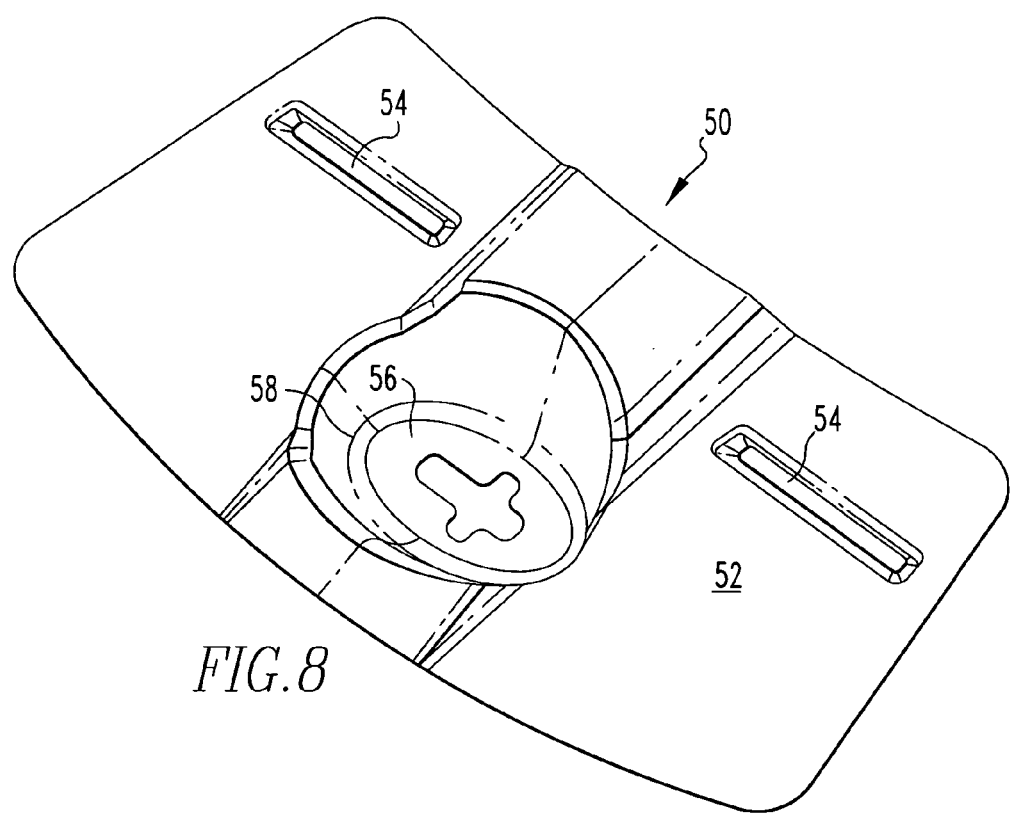
FIG. 8 illustrates an alternative embodiment of the invention.

FIG. 8 is a sketch of an alternative embodiment of the present invention. Combined palm-latch reinforcement 50 includes a palm area reinforcement 52 and a depression 58 including an oval latch area reinforcement 56. This is in contrast to the latch area reinforcement 26 of the palm-latch reinforcement, which is shaped as a rectangle with rounded corners, as seen in FIG. 2.

Furthermore, the palm-latch reinforcement 50 has stiffening grooves 54, which do not cross the central region, as did the stiffening groove 24 having center portion 29 in the palm-latch reinforcement 20.

Figure 9:
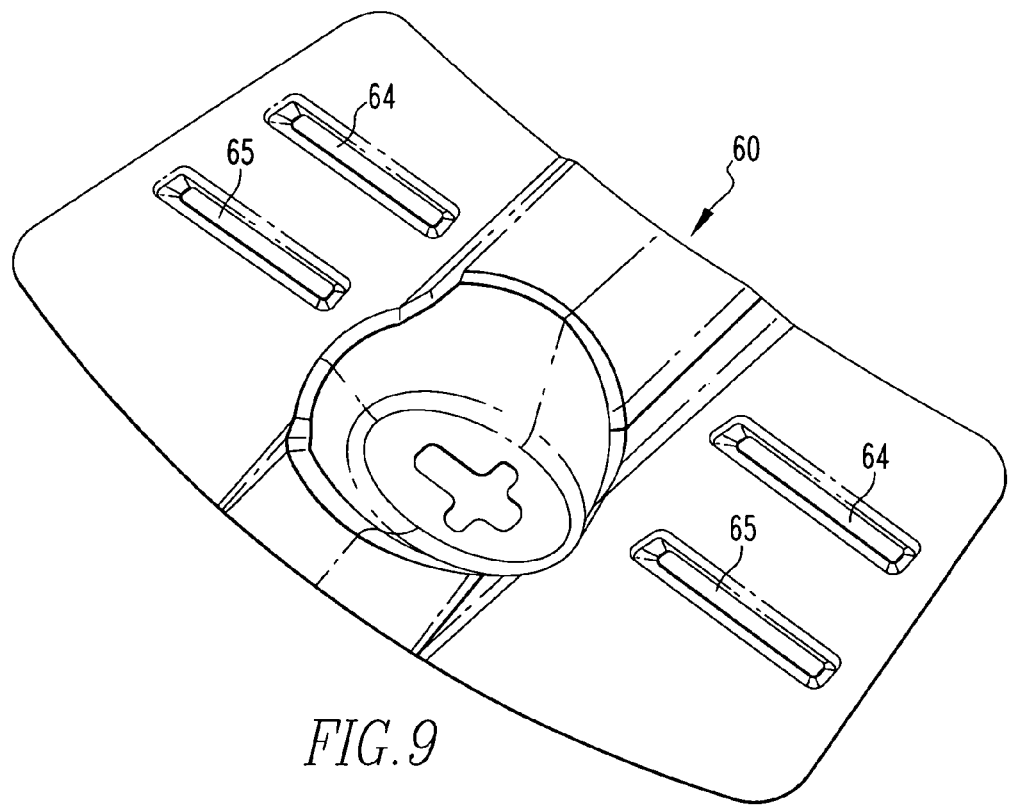
FIG. 9 illustrates another alternative embodiment of the invention.

FIG. 9 illustrates another embodiment 60 including stiffening grooves 64 and also additional stiffening grooves 65.

The present invention has been described in reference to a hood of a motor vehicle. Of necessity, the hood shown had a particular shape, which dictated the particular shape of the embodiments shown. The invention is also applicable to vehicle hoods having different configurations, as well as to deck lids and other closure panels. The scope of the invention is best established by reference to the following claims.

We claim:

1. A combined palm-latch reinforcement for a closure panel, the reinforcement comprising:
    a single piece of sheet metal blank having two substantially planar sections and a center section therebetween;
    wherein each of the two substantially planar sections include at least one stiffening member;
    wherein the center section includes a depression formed therein that defines a top portion and a bottom portion being spaced apart by at least three side abutting walls therebetween, wherein the bottom portion includes an opening adapted for receiving a latch,
    whereby, the reinforcement is an integral unit which does not require separate assembly of the two substantially planar sections and the center section to each other to form the reinforcement.

2. The reinforcement, according to claim 1, wherein the reinforcement is comprised of stamped and punched sheet metal.

3. The reinforcement, according to claim 1, wherein the at least one stiffening groove includes at least two stiffening grooves.

4. The reinforcement, according to claim 1, wherein the bottom portion is shaped as a rectangle with rounded corners.

5. The reinforcement, according to claim 1, wherein the bottom portion is shaped as an oval.

6. The reinforcement, according to claim 1, wherein the top portion includes at least one inner back portion.

7. The reinforcement, according to claim 1, wherein the top portion includes at least one inner front portion.

8. The reinforcement, according to claim 1, wherein the top portion includes at least one inner back portion and at least one inner front portion.

9. A closure panel for a motor vehicle, the closure panel comprising: an inner panel, the inner panel including a latch area; an outer panel, the outer panel including a palm area adjacent the latch area of said inner panel; a reinforcement being disposed between the outer panel and the inner panel; the reinforcement being a single piece of sheet metal blank having two substantially planar sections and a center section therebetween, wherein each of the two substantialy planar sections include at least one stiffening member, wherein the center section includes a depression formed therein that defines a top portion and a bottom portion spaced apart by at least three side abutting walls therebetween, wherein the bottom portion includes an opening adapted for receiving a latch.

10. The closure panel, according to claim 9, wherein the two substantially planar sections and the top portion are attached by an adhesive to the palm area of the outer panel.

11. The closure panel, according to claim 9, wherein the outer panel is joined to the inner panel by adhesives placed at various positions on the inner panel, and by a hem around a perimeter of the closure panel.

12. The closure panel, according to claim 9, wherein the closure panel is a hood for a motor vehicle.

13. The reinforcement according to claim 6, wherein the at least one inner back portion is substantially parallel with and directly adjacent to the two substantially planar sections.

14. The reinforcement according to claim 7, wherein the at least one inner front portion is substantially parallel with and directly adjacent to the two substantially planar sections.

15. The reinforcement according to claim 8, wherein the at least one inner back portion and the at least one inner front portion are substantially parallel with and directly adjacent to the two substantially planar sections.

16. The reinforcement according to claim 8 wherein the center section includes at least one stiffening member.

* * * * *